US009567726B2

(12) United States Patent
Joergensen et al.

(10) Patent No.: US 9,567,726 B2
(45) Date of Patent: Feb. 14, 2017

(54) MACHINE CONTROL SYSTEM FOR A WHEEL LOADER COMPRISING A GRADING BLADE

(71) Applicant: HEXAGON TECHNOLOGY CENTER GMBH, Heerbrugg (CH)

(72) Inventors: Claus Joergensen, Odense (DK); Sten Kristensen, Odense (DK); Bo Pettersson, London (GB)

(73) Assignee: HEXAGON TECHNOLOGY CENTER GMBH, Heerbrugg (CH)

(*) Notice: Subject to any disclaimer, the term of this patent is extended or adjusted under 35 U.S.C. 154(b) by 19 days.

(21) Appl. No.: 14/438,198

(22) PCT Filed: Oct. 23, 2013

(86) PCT No.: PCT/EP2013/072151
§ 371 (c)(1),
(2) Date: Apr. 23, 2015

(87) PCT Pub. No.: WO2014/064143
PCT Pub. Date: May 1, 2014

(65) Prior Publication Data
US 2015/0292179 A1    Oct. 15, 2015

(30) Foreign Application Priority Data
Oct. 24, 2012 (EP) ..................................... 12189834

(51) Int. Cl.
*E02F 9/22* (2006.01)
*E02F 3/84* (2006.01)
(Continued)

(52) U.S. Cl.
CPC ............ *E02F 3/847* (2013.01); *E02F 3/3411* (2013.01); *E02F 3/431* (2013.01); *E02F 9/0841* (2013.01);
(Continued)

(58) Field of Classification Search
USPC ............................ 172/4.5, 1, 12, 779; 701/50
See application file for complete search history.

(56) References Cited

U.S. PATENT DOCUMENTS 3,497,014 A * 2/1970 Ask .......................... E02F 3/844
                                                    172/4.5
4,263,973 A * 4/1981 Boulais ..................... E02F 3/84
                                                    172/12
(Continued)

FOREIGN PATENT DOCUMENTS

CN         1434177 A        8/2003
EP      0 811 727 A1      12/1997
(Continued)

OTHER PUBLICATIONS

Front-End Grader FG, web.archive.org/web/20130906114956/http://www.d-gutzwiller.com/products/laser-guided-grading-blade/front-end-grader-fg/ (last accessed Jun. 23, 2016).*
(Continued)

*Primary Examiner* — Thomas Tarcza
*Assistant Examiner* — Richard Goldman
(74) *Attorney, Agent, or Firm* — Maschoff Brennan (57) ABSTRACT

Machine control systems for controlling a land levelling or earthmoving process of a wheel loader relative to a working plane are disclosed. In some embodiments, the wheel loader may be equipped with a land levelling or earthmoving blade and may comprise tool positioning means for adjusting the position and orientation of the tool relative to the first body. In some embodiments, the machine control system comprises a machine control unit and an orientation detection system. In some embodiments, the orientation detection system may include orientation detection means which are designed to be attached to the blade and/or to the wheel loader for detecting a position and an orientation of the blade relative to a working plane. In some embodiments, the
(Continued)

orientation detection means are adapted to generate orientation data according to the relative position and orientation of the blade and to transmit the orientation data to the machine control unit.

19 Claims, 6 Drawing Sheets (51) Int. Cl.
    *E02F 3/34* (2006.01)
    *E02F 3/43* (2006.01)
    *E02F 9/08* (2006.01)
    *E02F 9/26* (2006.01)
    *G01C 15/00* (2006.01)

(52) U.S. Cl.
    CPC ............... *E02F 9/22* (2013.01); *E02F 9/262* (2013.01); *E02F 9/265* (2013.01); *G01C 15/004* (2013.01)

(56) References Cited

U.S. PATENT DOCUMENTS

| | | |
|---|---|---|
| 5,815,826 A | 9/1998 | Henderson et al. |
| 6,947,820 B2 | 9/2005 | Ohtomo et al. |
| 7,857,071 B1 | 12/2010 | McCain et al. |
| 2006/0245902 A1* | 11/2006 | Hicok ................ E02F 9/26 414/700 |
| 2007/0219693 A1* | 9/2007 | Stratton ............. E02F 9/2029 701/50 |
| 2008/0073089 A1* | 3/2008 | Green ................ E02F 3/847 172/2 |
| 2009/0029826 A1* | 1/2009 | Eguchi .............. B60T 7/02 477/39 |
| 2009/0069987 A1* | 3/2009 | Omelchenko ....... E02F 3/842 701/50 |
| 2009/0183886 A1* | 7/2009 | Armas .............. E02F 3/3414 172/779 |
| 2010/0106381 A1* | 4/2010 | Pline ................ E02F 3/439 701/50 |
| 2010/0183369 A1* | 7/2010 | Lindley ............. E01C 19/402 404/84.5 |
| 2012/0000681 A1* | 1/2012 | Douglas ............ E02F 3/845 172/1 |
| 2012/0136508 A1 | 5/2012 | Taylor et al. |
| 2013/0000092 A1* | 1/2013 | Hukkeri ............ G05D 1/021 29/402.01 |
| 2015/0275469 A1* | 10/2015 | Fredrickson ....... E02F 3/3414 414/685 |

FOREIGN PATENT DOCUMENTS

| | | |
|---|---|---|
| EP | 1 988 220 A2 | 11/2008 |
| EP | 2570769 A1 | 3/2013 |
| JP | H07-180174 A | 7/1995 |

OTHER PUBLICATIONS

European Search Report dated Mar. 6, 2013 as received in Application No. 12 18 9834.

* cited by examiner

MACHINE CONTROL SYSTEM FOR A WHEEL LOADER COMPRISING A GRADING BLADE

FIELD OF THE INVENTION

The present invention pertains to a machine control system for controlling a land levelling or earthmoving process of a wheel loader with a land levelling or earthmoving blade in a predefined working plane.

BACKGROUND

On building sites and construction areas, land levelling and earthmoving processes are often performed by bulldozers. These are equipped with continuous tracks for providing a stable attitude relative to the ground and a dozer blade for shoving sand, soil and debris. For land levelling usually a straight blade is used, which is relatively short and does not have a lateral curve or side wings.

Bulldozers have a disadvantage compared to wheel loaders, though, as the operating costs are higher. For instance, the transfer of bulldozers to the worksite is expensive, as even for short distances bulldozers need to be carried to the worksite, e.g. on articulated vehicles, whereas wheeled heavy machinery such as a wheel loader normally can be driven on its own wheels on public roads.

Therefore, an increasing number of wheel loaders are being used on construction sites for grading operations and allied fields. On the other hand, the use of wheel loaders for precise land levelling and earthmoving processes is complicated and challenging for the operator if a predefined working plane is to be maintained. Due to their wheels, wheel loaders generally have a higher center of gravity than bulldozers. Also, the dampers work independently at the two axles. Thus, the working axis of a wheel loader is subject to higher acceleration oscillations and other variations, for instance if heavy load on the loader bucket or blade shifts the center of gravity towards the front. Additionally, there is the possibility of wheel spin leading to a submerging of one or more wheels beneath the working plane. Thus, for an operator it is almost impossible to keep the tool of the loader in the correct position and orientation relative to the working plane all the time throughout the process.

Thus, there is a need a machine control system for precise land levelling and earthmoving processes aiding the operator to always hold the tool in the correct position and orientation—in particular the correct height and tilt angle—relative to the working plane.

There are some machine control aiding systems for heavy machinery equipment known from prior art that measure the position and/or orientation of a tool relative to the machinery and either provide a feedback for the operator about the position and attitude or at least partially operate the machinery automatically. For instance, U.S. 2006/0245902 A1 discloses a system identifying an orientation of a loader bucket and an indication of said orientation to an operator, and EP 1 988 220 A2 discloses a machine control system for wheel loaders and other heavy machinery equipment adapted to automatically relocate the tool into predefined positions.

The available systems are not suitable, though, for the special needs of precise land levelling and earthmoving processes with a wheel loader and a blade that can be used for land levelling or earthmoving purposes in a predefined working plane.

SUMMARY

Some embodiments of the present invention provide an improved machine control system for a wheel loader that supports an operator of the wheel loader in performing land levelling or earthmoving processes.

Some embodiments provide such a machine control system that allows performing land levelling or earthmoving processes with a higher accuracy.

Some embodiments of the invention provide such a machine control system that is adapted to automatically perform steps of land levelling or earthmoving processes.

Some embodiments of the invention provide an improved method for controlling a land levelling or earthmoving process of a wheel loader.

At least one of these objects is achieved by the machine control system, the wheel loader, the method for controlling a land levelling or earthmoving process, or the computer program product of the present invention.

According to the present invention, a machine control system comprises a machine control unit (MCU) and an orientation detection system and is specially adapted for controlling a land levelling or earthmoving process of a wheel loader having a land levelling or earthmoving blade. The orientation detection system comprises orientation detection means which are designed to be attached to the blade and/or to the wheel loader for detecting a position and an orientation of the blade relative to a working plane. The orientation detection means are adapted to generate orientation data according to the position and orientation of the blade and to transmit the orientation data to the MCU. All data preferably can be transmitted wireless, for instance with a Bluetooth™ or similar connection.

The MCU is adapted for generating a graphic representation of the wheel loader and the blade with a position and orientation of the blade relative to the working plane based on the orientation data, and/or for at least partially controlling the land levelling or earthmoving process by automatically operating the tool positioning means for adjusting the position and orientation of the blade relative to the working plane based on the orientation data.

In a preferred embodiment of the machine control system, the MCU is adapted for generating the graphic representation with a vertical distance and a tilt angle of the blade relative to the working plane.

In another preferred embodiment of the machine control system, the MCU is adapted for automatically operating the tool positioning means for adjusting a vertical distance and a tilt angle of the blade relative to the working plane.

The MCU can comprise calculation means with an algorithm for performing the calculation of the present position and orientation of the wheel loader and the tool relative to the plane based on the received orientation data. Alternatively or additionally, the MCU can be connected with external calculation means, in particular by wireless connection. In this case data about the present land levelling or earthmoving process—comprising information about the working plane—can be dynamically updated also during the process.

In a further preferred embodiment of the machine control system, the orientation detection means comprise visible features that are identifiable by external surveying means of the orientation detection system so that a position and orientation of the visible features relative to the surveying means is determinable. Preferably, the external surveying means comprises a laser tracker having a camera, and the visible features comprise a retro-reflector system with a retro-reflector and active or passive lighting means.

In another embodiment of the machine control system, the orientation detection means comprise a tilt sensor and a means for external positioning, such as a laser receiver, a distance measuring device, in particular an ultrasonic distance meter, directed to the ground, or a global navigation satellite system (GNSS) antenna. In another embodiment of the machine control system, the orientation detection means comprise two means for external positioning.

In another embodiment of the machine control system—particularly if the orientation detection means are not to be placed directly on the blade, but on the wheel loader—the orientation detection system comprises at least one angle encoder for measuring angles on the tool positioning system, in particular between the front of the wheel loader and a member of the tool positioning means,
members of the tool positioning means and/or
a member of the tool positioning means and the blade.

Preferably, three rotational degrees of freedom are detected at each position.

In a preferred embodiment, the machine control system is adapted for use with a wheel loader of the type that has a front part and a rear part which are connected by an articulated steering joint. Preferably—particularly if the orientation detection means are to be placed on the rear part of the wheel loader—the orientation detection system comprises an angle encoder at the articulated steering joint for measuring an angle between the first body and the second body, in particular three rotational degrees of freedom.

In another preferred embodiment, the machine control system is adapted for use with a wheel loader that has hydraulically actuated tool positioning means, particularly Z-kinematics or parallel kinematics, and is adapted for automatically operating the hydraulically actuated tool positioning means.

In a further preferred embodiment of the machine control system, the orientation detection means can include an inertial measuring unit (IMU), in particular adapted to be positioned on the tool. The IMU comprises IMU-sensors including accelerometers and gyroscopes and particularly is designed in form of a micro-electro-mechanical system (MEMS).

As described in the European patent application with the application No. EP11181118, the IMU can be used for bridging the data generated by the other orientation detection means, thus further enhancing the precision of the process. The IMU is adapted to measure translational and/or rotational accelerations of the tool or any other part of the wheel loader or orientation detection means it is attached to. Though other orientation detection means have a higher accuracy than an IMU, this measuring of translational and/or rotational accelerations with an IMU takes place at a higher measurement rate than the measuring with other orientation detection means.

Preferably, the IMU is configured for repeatedly determining translational and/or rotational acceleration data with a higher rate than the determination rate of the other orientation detection means. The measurement rate of the IMU in particular can be between 50 and 500 Hz, whereas other means may have only a rate of 1 to 20 Hz. Thus, especially if the MCU is adapted for automatically operating the tool positioning means, measurement data generated by an IMU can be used for bridging the measurement rate of the other orientation detection means to improve the control loop of the MCU. The algorithm (for instance comprising a Kalman-Filter) of the MCU for operating the tool positioning means can operate at a rate equivalent to that of the IMU. Advantageously, by using an IMU the other orientation detection means can be adapted to work at a slower rate than without the IMU, which means that they can be cheaper or smaller and also consume less energy, which is especially important if they are battery operated.

According to another aspect of the invention, a wheel loader is equipped with such a machine control system.

According to a further aspect of the invention, a method is adapted for controlling a land levelling or earthmoving process of a wheel loader relative to a working plane, wherein the wheel loader is equipped with a land levelling or earthmoving blade and comprising tool positioning means for adjusting the position and orientation of the blade relative to the wheel loader. The method comprises detecting a position and an orientation of the blade relative to the working plane and generating orientation data according to the detected relative position and orientation of the blade. According to the invention the method further comprises generating and displaying a graphic representation of the wheel loader and the blade with a position and orientation of the blade relative to the working plane based on the orientation data, or at least partially controlling the land levelling or earthmoving process by automatically operating the tool positioning means for adjusting the position and orientation of the blade relative to the working plane based on the orientation data.

In a preferred embodiment of the method, the graphic representation comprises a vertical distance and a tilt angle of the blade relative to the working plane.

In another preferred embodiment of the method, automatically operating the tool positioning means comprises adjusting a vertical distance and a tilt angle of the blade relative to the working plane.

In another preferred embodiment of the method, detecting a position and an orientation of the blade relative to the working plane comprises
referencing external surveying means relative to the working plane,
identifying visible features on the blade or on the wheel loader by the external surveying means, and
measuring the position and orientation of the visible features relative to the external surveying means.

Preferably, the external surveying means comprises a laser tracker having a camera, and the visible features comprise a retro-reflector system with a retro-reflector and active or passive lighting means.

In another embodiment of the method according to the invention, detecting a position and an orientation of the blade relative to the working plane comprises emitting a laser plane with a rotating laser beam parallel and in a known distance relative to the working plane, and detecting the vertical distance of the blade relative to the laser plane by receiving the laser beam with a laser receiver.

In another embodiment of the method according to the invention, detecting a position and an orientation of the blade relative to the working plane comprises detecting a position and an orientation of the wheel loader relative to the working plane and detecting a position and an orientation of the blade relative to the wheel loader in particular by means of at least one angular encoder.

According to another aspect of the invention a computer program product has computer-executable instructions for performing the above described method, in particular when run on a machine control unit of the machine control system.

BRIEF DESCRIPTION OF THE DRAWINGS

The invention in the following will be described in detail by referring to exemplary embodiments that are accompanied by figures, in which.

DETAILED DESCRIPTION

Figure 1A:
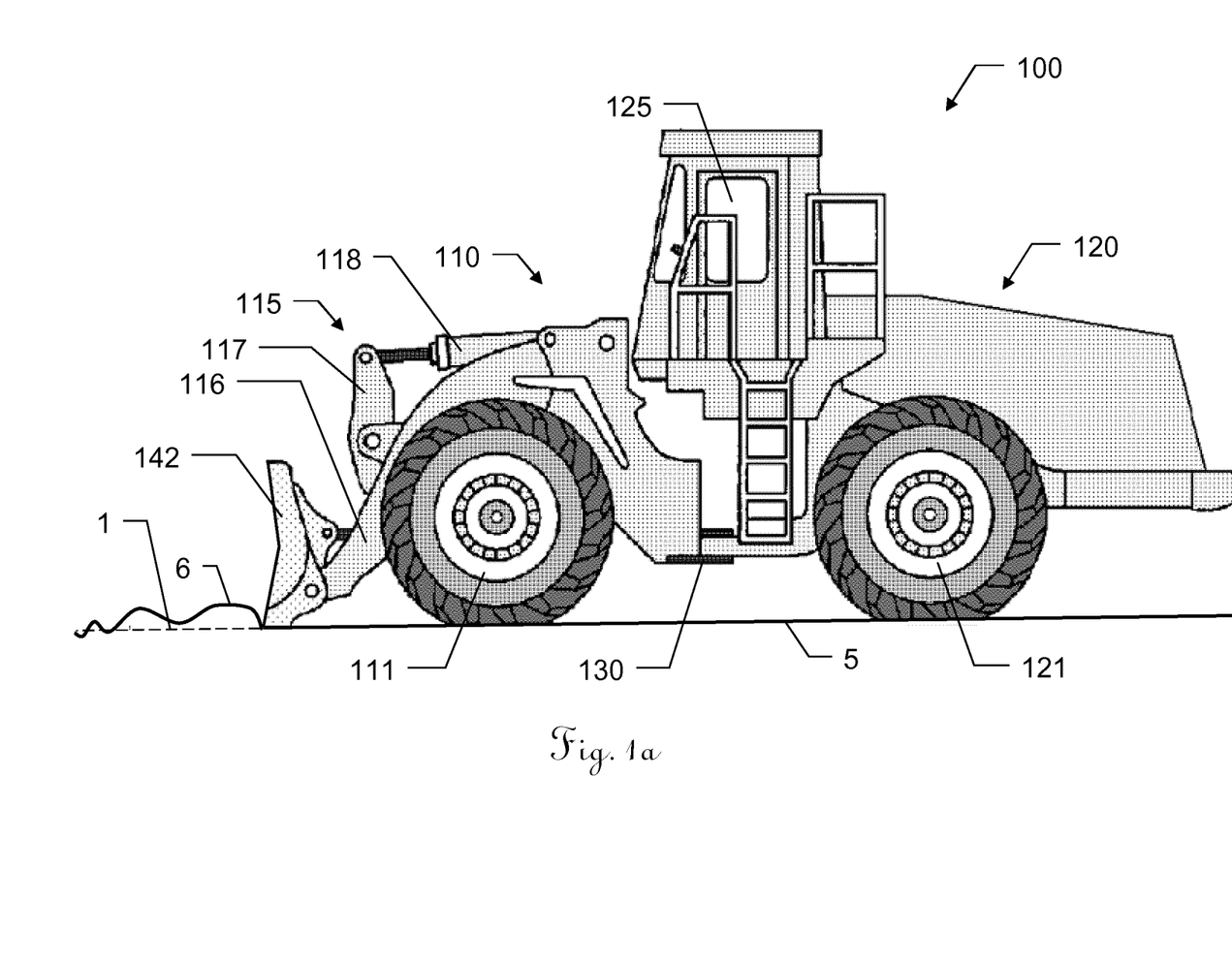
FIGS. 1a-b show two embodiments of a wheel loader with a levelling tool for performing a land levelling process.

FIG. 1a shows a first embodiment of a wheel loader 100 performing a land levelling process in a working plane 1. The depicted wheel loader 100 has an articulated steering joint 130 between a front body 110 and a rear body 120, thus allowing both axles to be solid and providing better maneuverability. The articulated steering joint 130 is hydraulically actuated and situated exactly between the front and rear axles.

The front body 110 comprises front wheels 111 and tool positioning means 115 for holding a tool that can be used for land levelling or earthmoving purposes in a working plane 1 (levelling tool) and adjusting the tool's position and attitude relative to the wheel loader 100. In this embodiment the tool positioning means 115 are arranged as a Z-kinematics and comprise hydraulically driven members 116-118. The levelling tool is a blade 142 fit for land levelling or earthmoving purposes and attached to a boom 116 of the tool positioning means 115.

The rear body 120 comprises rear wheels 121 and the driver cab 125. Furthermore, the engine (not shown) of the wheel loader 100 is provided in the rear body 120.

Figure 1B:
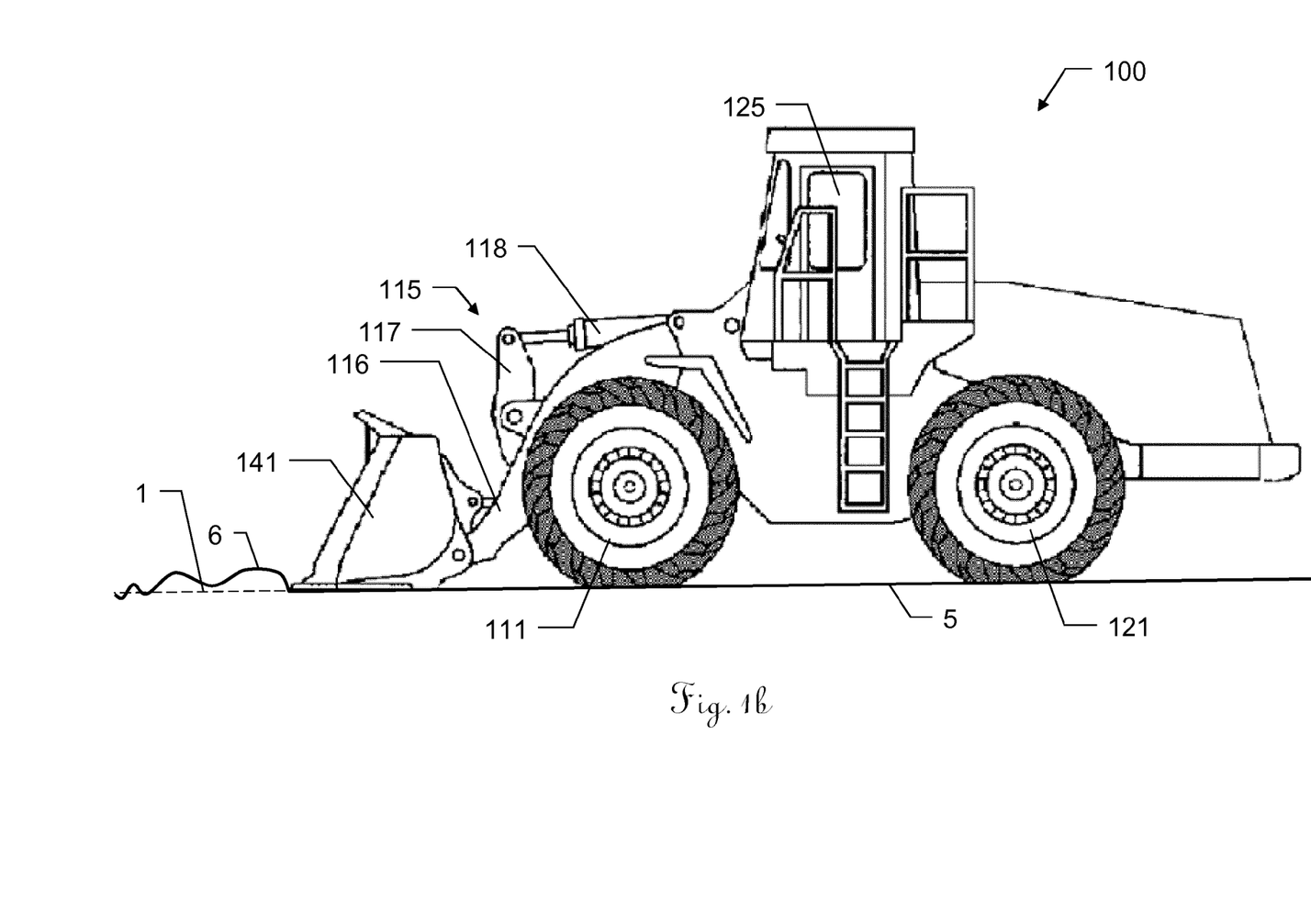

FIG. 1b shows a second embodiment of a wheel loader 100 performing a land levelling process in a working plane 1. In contrast to the first embodiment the second embodiment of the wheel loader 100 has a single body and no articulated steering joint. The levelling tool is a loader bucket 141 that can be used for land levelling or earthmoving purposes.

Figure 2:
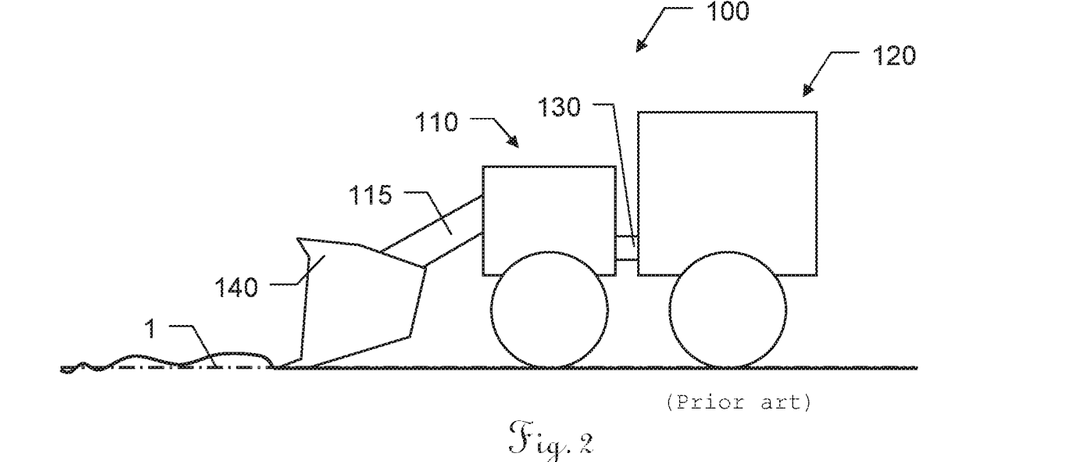
FIG. 2 shows a simplified representation of a wheel loader with a levelling tool.

FIG. 2 shows a simplified representation of a wheel loader 100 having a front body 110 and a rear body 120 connected by an articulated steering joint 130. A levelling tool 140 is attached to the tool positioning means 115 of the front body 110.

Figure 3A:
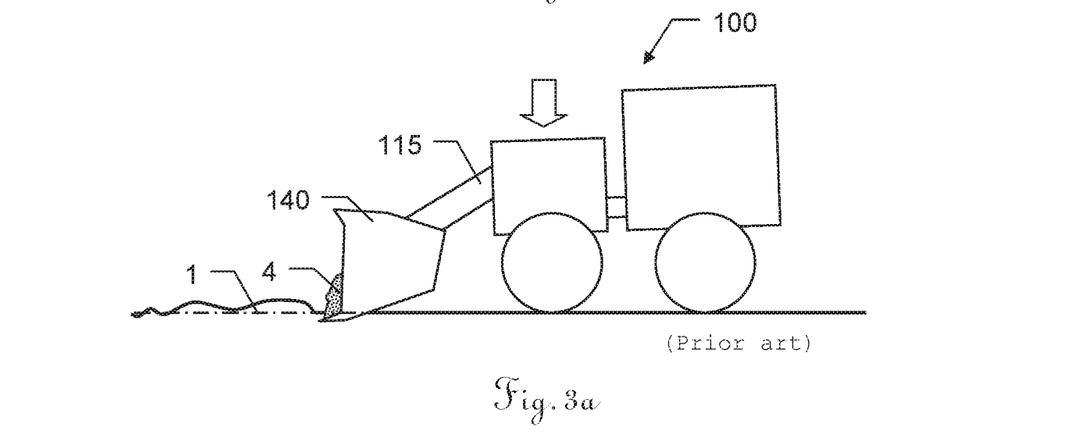
FIGS. 3a-b illustrate a land levelling or earthmoving process with the wheel loader of FIG. 2.
Figure 3B:
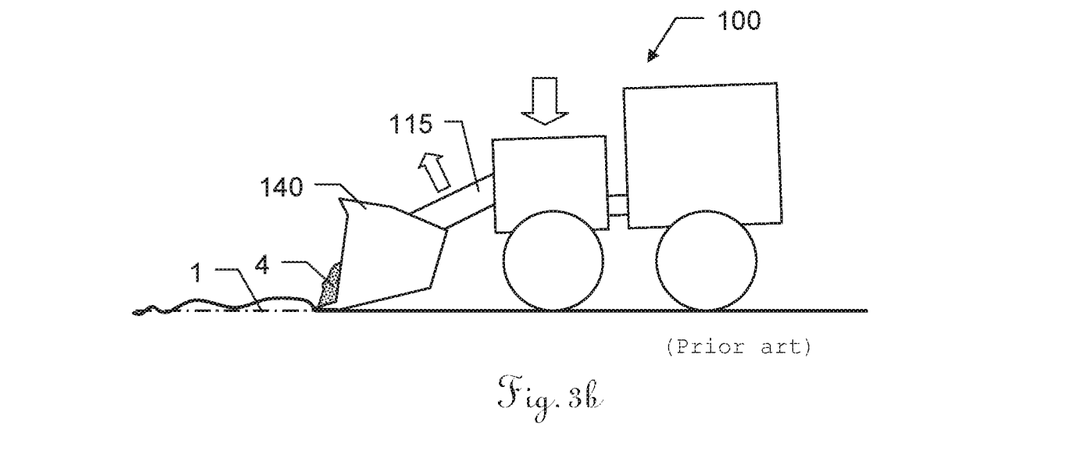

In FIG. 3a the wheel loader 100 of FIG. 2 is shown, the levelling tool 140 being partially filled with material 4, for instance sand, soil or debris. The weight of this material 4 pushes the front body 110 of the wheel loader 100 downwards on the dampers of the front axle, thus lowering the levelling tool 140 relative to the working plane 1. In FIG. 3b, as a reaction to the dropped levelling tool 140, the tool positioning means 115 are raised to position the bottom side of the levelling tool 140 on the working plane 1 again. As there is no machine control unit provided, the operator must be very skilled to keep the levelling tool 140 exactly in this position for performing a land levelling process in the working plane 1.

Figure 4A:
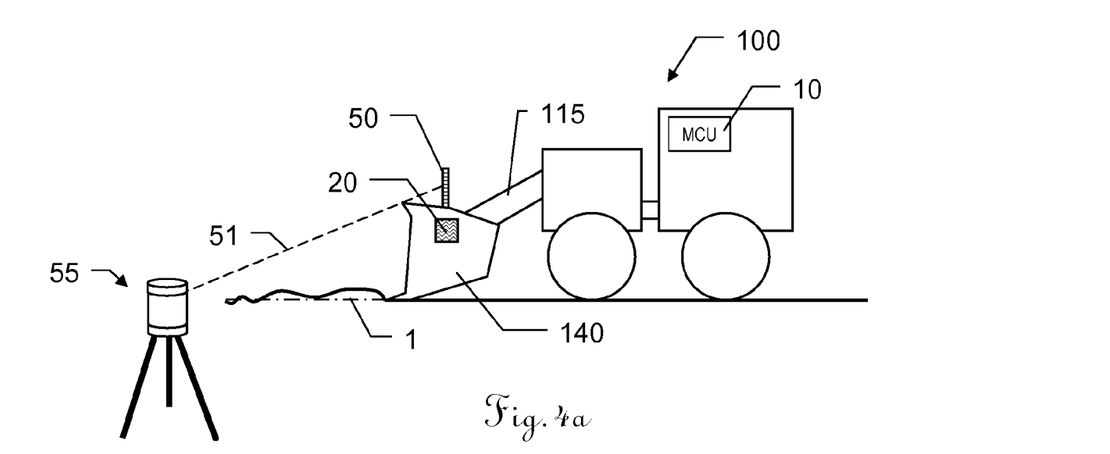
FIGS. 4a-c show three variations of a first embodiment of an orientation detection system of a machine control system according to the invention.
Figure 4B:
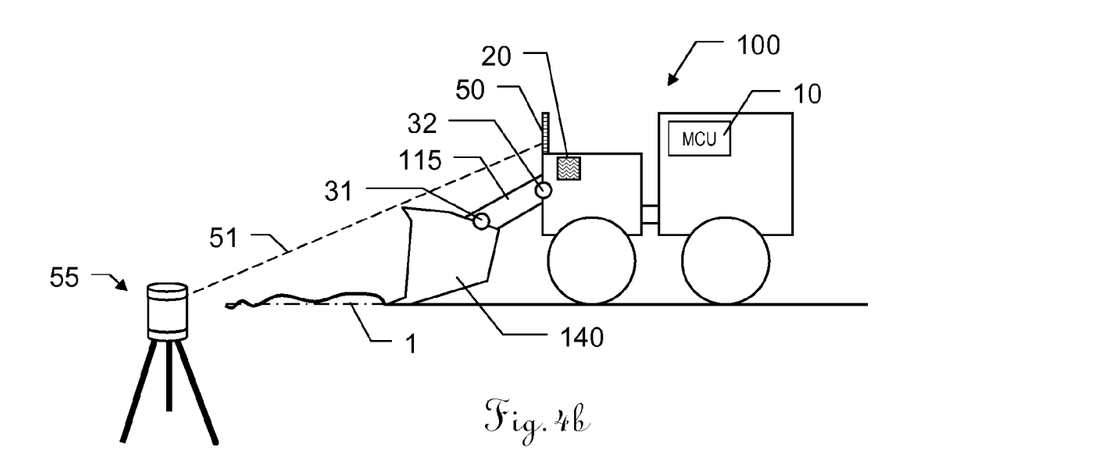
Figure 4C:
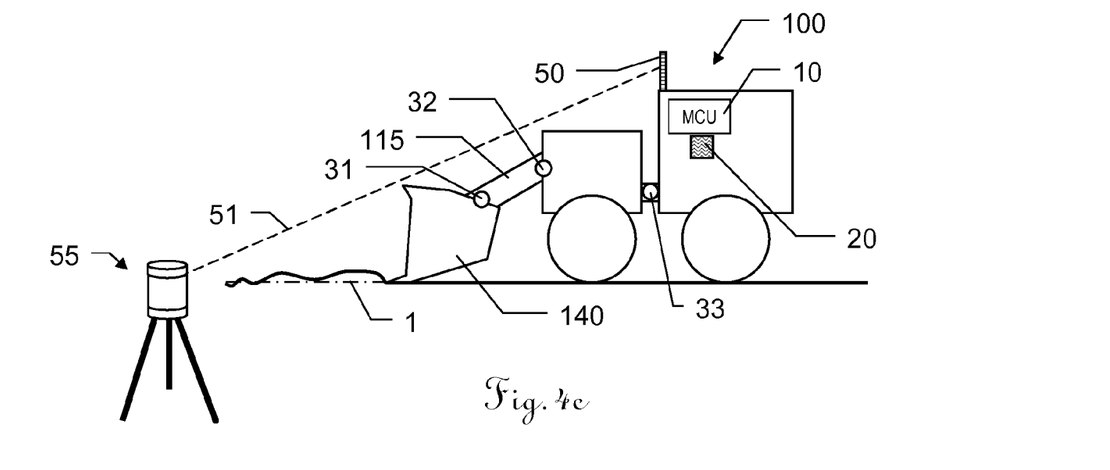

FIGS. 4a-c show the wheel loader 100 of FIG. 2 with three variations of a first embodiment of an orientation detection system of a machine control system according to the invention. The orientation detection system is designed to detect a position and attitude of the levelling tool 140 relative to the working plane. In the first embodiment a laser rotator 55 that is referenced to the working plane 1 emits a laser beam 51 in a rotating manner thus creating a "laser plane" parallel and in a known distance to the working plane 1. A receiver 50 for receiving the laser beam and a tilt sensor 20 for detecting the plumb line are positioned on a component of the wheel loader 100. The receiver is adapted to detect an elevation of the laser beam 51, thus allowing deducing the distance to the working plane 1. A machine control unit (MCU) 10 is provided at the wheel loader 100, preferably at the driver cab 125 (not shown here, see FIGS. 1a-b). The MCU 10 is adapted for receiving orientation data generated by the orientation detection system according to the position and orientation of the levelling tool 140 in order to deduce an actual position and orientation of the levelling tool 140 relative to the working plane 1. The orientation data is transmitted wireless. The CMU 10 is furthermore adapted to display the actual position and orientation of the levelling tool 140 relative to the working plane 1 to a user, in particular by generating a graphic representation of the wheel loader 100 with a position and orientation of the levelling tool 140 relative to the working plane based on the orientation data In FIG. 4a the receiver 50 and the tilt sensor 20 are mounted on the levelling tool 140, thus directly measuring the position and attitude of the levelling tool 140. In FIG. 4b the receiver 50 and the tilt sensor 20 are mounted on the front body 110 of the wheel loader 100. Angle encoders 31,32 are provided for measuring angles between the front body 110, the tool positioning means 115 and the levelling tool 140. In FIG. 4c the receiver 50 and the tilt sensor 20 are mounted on the rear body 120 of the wheel loader 100. Angle encoders 31-33 are provided for measuring angles between the rear body 120, the front body 110, the tool positioning means 115 and the levelling tool 140.

Figure 5A:
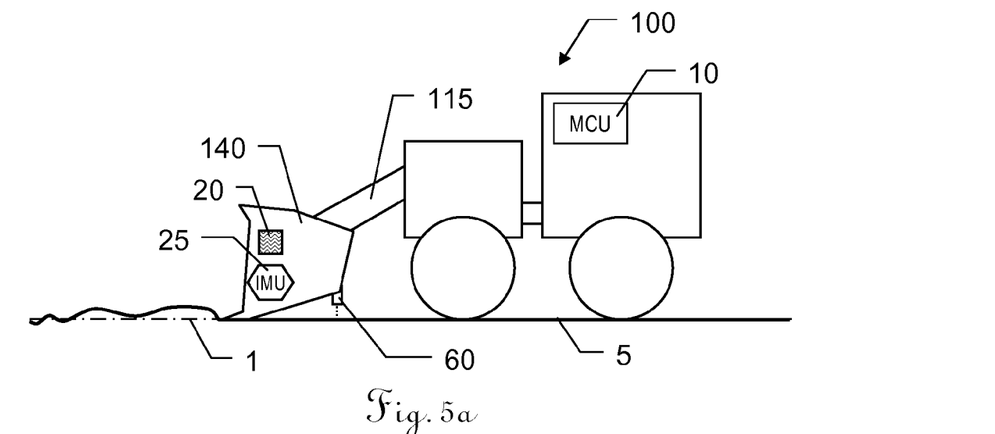
FIGS. 5a-c show three variations of a second embodiment of an orientation detection system of a machine control system according to the invention.
Figure 5B:
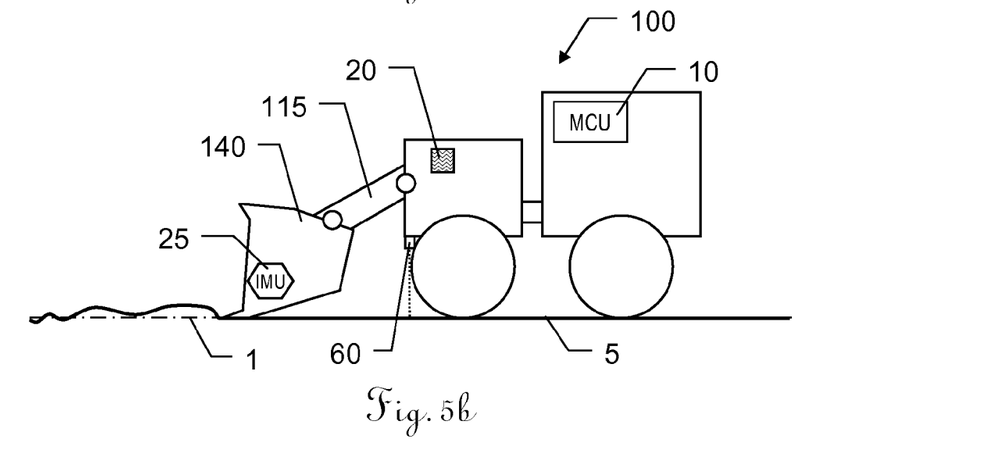
Figure 5C:
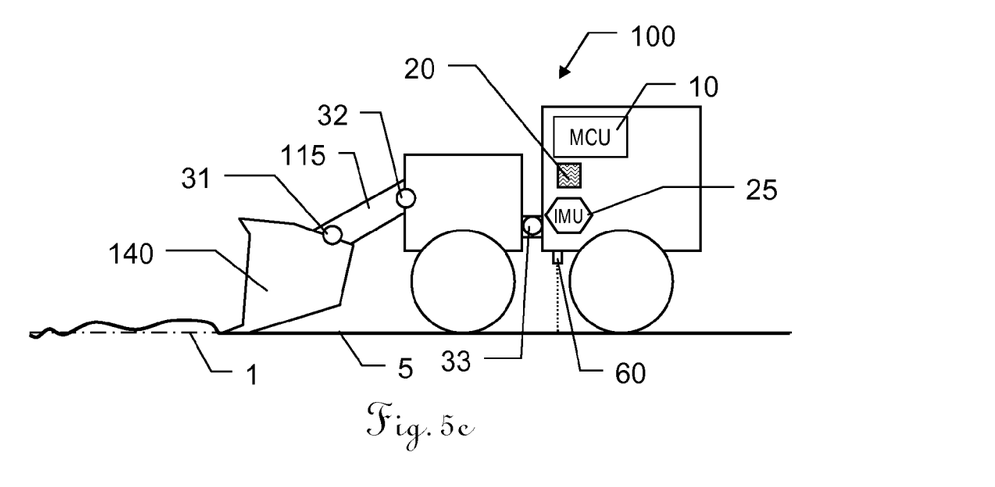

FIGS. 5a-c show the wheel loader 100 of FIG. 2 with three variations of a second embodiment of an orientation detection system of a machine control system according to the invention. Instead of a receiver for receiving a laser beam as depicted in FIGS. 4a-c the vertical distance to the working plane 1 is determined by means of a distance measuring device 60 which measures the distance to the ground 5. The distance measuring device 60 e.g. can operate by emitting and receiving ultrasound or a laser beam and determining the time offset. Additionally, a tilt sensor 20 is provided on the same component as the distance measuring device for determining a tilting angle. Alternatively, a second distance measuring device 60 can be used instead of the tilt sensor 20 for determining the tilting angle. The CMU 10 is adapted for at least partially controlling the land levelling or earthmoving process by automatically operating the tool positioning means 115 for adjusting the position and orientation of the levelling tool 140 relative to the working plane 1. An inertial measuring unit (IMU) 25 is provided for measuring translational and/or rotational accelerations, thus improving the control loop of the operation of the tool positioning means 115 by bridging the slower sample rate of the distance measuring device 60 and the tilt sensor 20. Though, the distance measuring device 60 and the tilt sensor 20 not only generate more precise data than the IMU 25 but also constantly precise data, whereas the precision of the IMU data diminishes quickly over time. The data of the distance measuring device 60 and the tilt sensor 20 therefore can be used for recalibrating the IMU 25. This recalibration can be performed every time the data is generated, at a set rate or only when it becomes necessary.

In FIG. 5a the distance measuring device 60 and the tilt sensor 20 are mounted on the levelling tool 140, thus directly measuring the vertical distance of the levelling tool 140 relative to the working plane 1 and the orientation of the levelling tool 140. The IMU 25 is also provided on the levelling tool 140.

In FIG. 5b the distance measuring device 60 and the tilt sensor 20 are mounted on the front body 110 of the wheel loader 100. Angle encoders 31,32 are provided between the front body 110, the tool positioning means 115 and the levelling tool 140. The IMU 25 is provided on the levelling tool 140.

In FIG. 5c the distance measuring device 60, the tilt sensor 20 and the IMU 25 are mounted on the rear body 120 of the wheel loader 100. Angle encoders 31-33 are provided between the rear body 120, the front body 110, the tool positioning means 115 and the levelling tool 140.

Figure 6A:
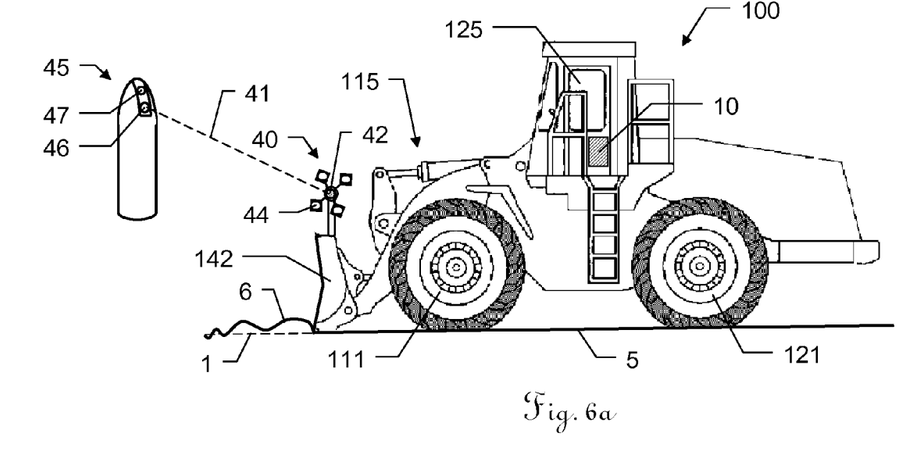
FIGS. 6a-b show two variations of a third embodiment of an orientation detection system of a machine control system according to the invention.
Figure 6B:
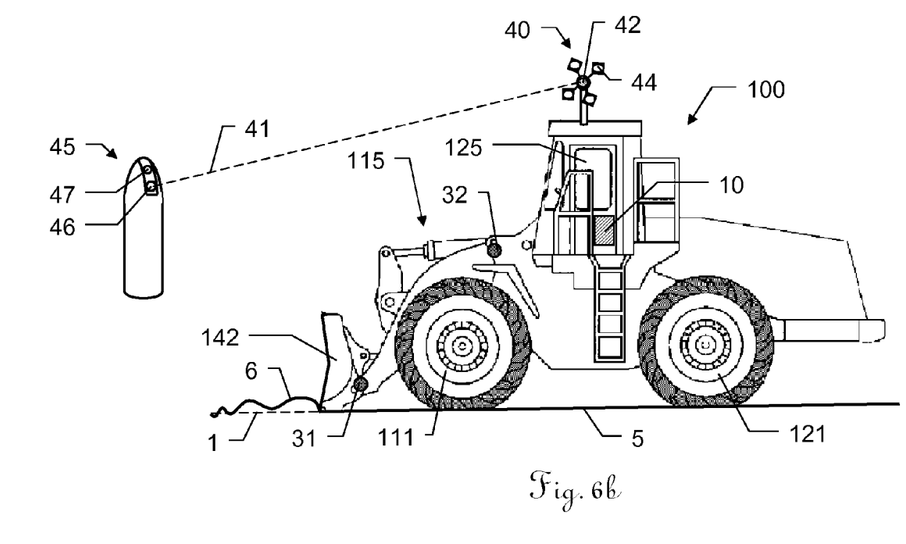

FIGS. 6a and 6b show a wheel loader 100 with a third embodiment of an orientation detection system of a machine control system according to the invention.

In FIG. 6a a retro-reflector system 40 with a retro-reflector 42 and lighting means 44 is provided on the levelling tool 142. A laser tracker 45 that is referenced with respect to the working plane 1 emits a laser beam 41 to the retro-reflector 42 for determining a relative position of the retro-reflector system 40 and by means of a camera 47 capturing a picture of the lighting means determines the orientation of the retro-reflector system 40. A CMU 10 provided at the driver cab 125 receives orientation data from the laser tracker 45 and generates a graphic representation of the wheel loader 100 and the levelling tool 142 with a position and orientation of the levelling tool 142 relative to the working plane 1 based on the orientation data. In particular, the representation comprises a vertical distance and a tilt angle of the levelling tool 142 relative to the working plane 1. The representation is then displayed to an operator as a support for the land levelling or earthmoving process.

In FIG. 6b the retro-reflector system 40 is provided on the driver cab 125 of the wheel loader 100. Angular encoders 31,32 are provided on the tool positioning means 115 for detecting a position and an orientation of the levelling tool 142 relative to the wheel loader 100. The CMU 10 receives orientation data from the laser tracker 45 and the angular encoders 31,32 for the generation of a graphic representation of the wheel loader 100 and the levelling tool 142 with a position and orientation of the levelling tool 142 relative to the working plane 1.

Additionally or alternatively, the CMU 10 can be adapted to adjust the position and orientation of the blade 142 relative to the working plane 1 based on the orientation data by operating the tool positioning means 115, thus at least partially controlling the land levelling or earthmoving process.

Although the invention is illustrated above, partly with reference to some preferred embodiments, it must be understood that numerous modifications and combinations of different features of the embodiments can be made. All of these modifications lie within the scope of the appended claims.

What is claimed is:

1. A machine control system for controlling a land levelling or earthmoving process of a heavy equipment machine relative to a working plane, the machine being equipped with a tool and comprising a first body with tool positioning means for adjusting the position and orientation of the tool relative to the first body, the machine control system comprising:
    a machine control unit and an orientation detection system, wherein the machine control system is specially adapted for controlling a land levelling or earthmoving process of a wheel loader relative to a working plane, the wheel loader being equipped with a land levelling or earthmoving blade; and
    an orientation detection system comprising orientation detection means designed to be attached to the blade and/or to the wheel loader for detecting a position and an orientation of the blade relative to a working plane, wherein:
        the orientation detection means are adapted to generate orientation data according to the relative position and orientation of the blade and to transmit the orientation data to the machine control unit, and
        the machine control unit is adapted for:
            generating and displaying a graphic representation of the wheel loader and the blade with a position and orientation of the blade relative to the working plane based on the orientation data, and/or
            at least partially controlling the land levelling or earthmoving process by automatically operating the tool positioning means for adjusting the position and orientation of the blade relative to the working plane based on the orientation data.

2. The machine control system according to claim 1, wherein:
    the machine control unit is adapted for
        generating the graphic representation with a vertical distance and a tilt angle of the blade relative to the working plane, and/or
        automatically operating the tool positioning means for adjusting a vertical distance and a tilt angle of the blade relative to the working plane, respectively.

3. The machine control system according to claim 1, wherein:
    the orientation detection means comprises visible features that are identifiable by external surveying means of the orientation detection system so that a position and orientation of the visible features relative to the surveying means is determinable, wherein:
        the external surveying means comprises a laser tracker having a camera, and
        the visible features comprise a retro-reflector system with a retro-reflector and active or passive lighting means.

4. The machine control system according to claim 1, wherein:
    the orientation detection means comprises:
        first means adapted to generate orientation data at a first rate between 1 and 20 Hz, and
        second means adapted to generate orientation data at a second rate between 50 and 500 Hz, wherein the second rate is higher than the first rate, wherein the orientation detection means comprise an inertial measuring unit for measuring translational and/or rotational accelerations.

5. The machine control system according to claim 1, wherein the orientation detection means comprises a tilt sensor, and one or more of the following:
a laser receiver,
a distance measuring device directed to the ground,
an ultrasonic distance meter directed to the ground, and/or
a global navigation satellite system antenna.

6. The machine control system according to claim 1, wherein the orientation detection means comprises one or more of the following:
two laser receivers,
two distance measuring devices directed to the ground,
ultrasonic distance meters directed to the ground, and
two global navigation satellite system antennas.

7. The machine control system according to claim 1, wherein:
the orientation detection system comprises an angle encoder for measuring an angle between the first body and the blade.

8. The machine control system according to claim 1, wherein the wheel loader comprises a second body and an articulated steering joint connecting the first body and the second body wherein:
the orientation detection system comprises an angle encoder at the articulated steering joint for measuring an angle between the first body and the second body.

9. The machine control system according to claim 1, wherein the wheel loader comprises a second body and an articulated steering joint connecting the first body and the second body wherein:
the orientation detection system comprises an angle encoder at the articulated steering joint for measuring at least a vertical angle between the first body and the second body.

10. The machine control system according to claim 1, wherein the machine control unit is adapted for at least partially controlling the land levelling or earthmoving process by automatically operating the tool positioning means, wherein:
the tool positioning means is adapted as hydraulically actuated tool positioning means; and
the machine control unit is adapted for automatically operating the hydraulically actuated tool positioning means.

11. The machine control system according to claim 1, wherein the machine control unit is adapted for at least partially controlling the land levelling or earthmoving process by automatically operating the tool positioning means, wherein:
the tool positioning means is adapted as hydraulically actuated tool positioning means with at least one of Z-kinematics and parallel kinematics; and
the machine control unit is adapted for automatically operating the hydraulically actuated tool positioning means with at least one of Z-kinematics and parallel kinematics.

12. A wheel loader comprising a machine control system according to claim 1.

13. A method for controlling a land levelling or earthmoving process of a heavy equipment machine relative to a working plane, the machine being equipped with a tool and comprising:
a first body, and
tool positioning means for adjusting the position and orientation of the tool relative to the first body, wherein the machine is a wheel loader and the tool is a land levelling or earthmoving blade,
the method comprising:
detecting a position of the blade relative to the working plane;
detecting an orientation of the blade relative to the working plane;
generating orientation data according to the detected relative position and orientation of the blade; and at least one of the following:
generating and displaying a graphic representation of the wheel loader and the blade with a position and orientation of the blade relative to the working plane based on the orientation data, and
at least partially controlling the land levelling or earthmoving process by automatically operating the tool positioning means for adjusting the position and orientation of the blade relative to the working plane based on the orientation data.

14. The method according to claim 13, wherein:
the graphic representation comprises a vertical distance and a tilt angle of the blade relative to the working plane, and/or
automatically operating the tool positioning means comprises adjusting a vertical distance and a tilt angle of the blade relative to the working plane, respectively.

15. The method according to claim 13, wherein:
detecting a position and an orientation of the blade relative to the working plane comprises
referencing external surveying means relative to the working plane,
identifying visible features on the blade or on the wheel loader by the external surveying means, and
measuring the position and orientation of the visible features relative to the external surveying means,
wherein
the external surveying means comprises a laser tracker having a camera, and
the visible features comprise a retro-reflector system with a retro-reflector and active or passive lighting means.

16. The method according to claim 13, wherein:
detecting a position and an orientation of the blade relative to the working plane comprises
measuring translational and/or rotational accelerations with an inertial measuring unit, and/or
emitting a laser plane with a rotating laser beam parallel and in a known distance relative to the working plane and detecting the vertical distance of the blade relative to the laser plane by receiving the laser beam with a laser receiver.

17. The method according to claim 13, wherein:
detecting a position and an orientation of the blade relative to the working plane comprises:
detecting a position and an orientation of the wheel loader relative to the working plane, and
detecting a position and an orientation of the blade relative to the wheel loader.

18. The method according to claim 13, wherein:
detecting a position and an orientation of the blade relative to the working plane comprises:
detecting a position and an orientation of the wheel loader relative to the working plane, and detecting a position and an orientation of the blade relative to the wheel loader by means of at least one angular encoder.

19. One or more non-transitory computer-readable media storing one or more programs that are configured, when executed, to cause one or more processors to execute the method as recited in claim 13.

\* \* \* \* \*